United States Patent
Petroff

[15] 3,704,957
[45] Dec. 5, 1972

[54] CAM OPERATED DRILL UNIT

[72] Inventor: Robert J. Petroff, 1703 S. Main St., Lombard, Ill. 60148

[22] Filed: Aug. 17, 1970

[21] Appl. No.: 64,164

[52] U.S. Cl. ............................... 408/129, 408/714
[51] Int. Cl. ............................................. B23b 47/18
[58] Field of Search ............ 408/129, 714, 130, 124; 10/129 R, 133 R

[56] References Cited

UNITED STATES PATENTS

| | | |
|---|---|---|
| 1,763,964 | 6/1930 | Hallenbeck ................ 408/129 |
| 2,885,914 | 5/1959 | Frank et al. ............. 408/129 X |
| 1,946,523 | 2/1934 | Cramer ................... 408/129 X |
| 3,178,739 | 4/1965 | Plummer et al ......... 408/714 X |
| 2,576,291 | 11/1951 | Fletcher ................. 408/129 X |

Primary Examiner—Andrew R. Juhasz
Assistant Examiner—Z. R. Bilinsky
Attorney—Luedeka, Fitch, Even and Tabin

[57] ABSTRACT

A drill unit adapted for controlled axial advancement of a drill from a retracted position toward a workpiece includes a quill axially movable within a housing. A cam follower operated by a rotatable cam provides reciprocating movement. Linkage between the cam follower and the drill allows the quill to accurately axially advance toward the workpiece and retract. Motor means for rotating the drill at high speed is mounted at the outer end of the drill and is axially movable therewith, the drill being operatively associated with the motor means. Biasing means between the linkage and the quill establish a preselected maximum axial force applicable to the quill by the linkage.

6 Claims, 4 Drawing Figures

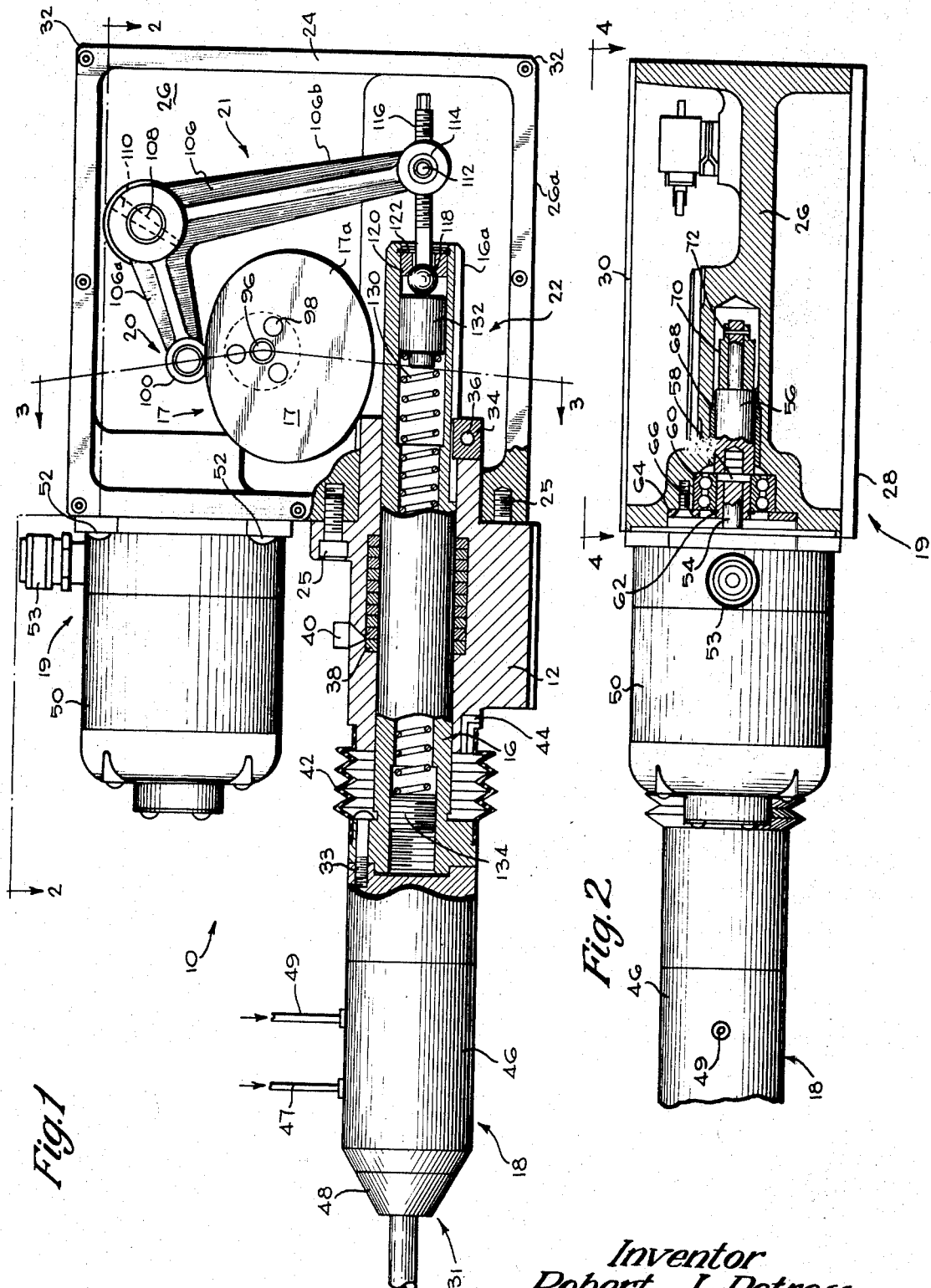

PATENTED DEC 5 1972

Inventor
Robert J. Petroff

Anderson, Luedeka, Fitch, Even, & Tabin
Attys.

CAM OPERATED DRILL UNIT

The present invention relates to drilling apparatus and, more particularly, the invention relates to a cam-operated drill unit for controlled axial advancement of a drill from a retracted position toward a workpiece.

It is highly desirable in many manufacturing operations to provide precision drilling equipment that can rapidly advance a drill to a workpiece, drill the desired hole in the workpiece and then rapidly retract the drill so that a second workpiece may be indexed for drilling. Moreover, it is desirable to provide apparatus that can accurately locate the drill in order that the drill hole will be precisely and controllably formed in the workpiece. Generally, in such apparatus, the workpiece to be drilled is brought to a station at which a drill is automatically or semiautomatically brought up to the face of the workpiece and is then advanced into the workpiece to the desired depth, following which the drill is retracted. An axially movable quill is provided having drive means at one end thereof for advancing the quill toward the workpiece and the same drive means is used for rotating a spindle having a drill received therein, the drill entering into and forming a hole in the workpiece. Typically, rotation of the drive means causes rotation of the spindle while the spindle advances or retracts axially with relation to the workpiece. Generally, after the hole has been drilled, the workpiece is conducted to a succeeding station in which the drilled hole may be provided with internal threads and then moved to still another station for further machining operations.

There are several disadvantages with available cam-operated drill apparatus. The drive means typically must both advance and retract the quill, the spindle and the drill and also provide motive power for the drill. When the drive means advances and retracts the drill by rotating the cam, it operates at a relatively low rate of speed so that it is generally incapable of contemporaneously rotating the drill at a relatively high rate of speed, e.g., on the order of 50,000 rpm, when this is required. Moreover, it frequently occurs that for some reason the drill is incapable of advancing into the workpiece. Nevertheless, if the spindle and the drill received therein are continuously advanced by a cam or similar device, a very large axial force is exerted upon the workpiece by the drill, the result usually being that the drill is damaged or destroyed or that the workpiece is forced out of position causing stoppage of the indexing mechanism.

Accordingly, it is a primary object of the present invention to provide an improved cam-operated drill unit that can accurately position a rapidly rotating drill in relation to a workpiece.

It is another object of the present invention to provide a cam-operated drill unit that can rapidly axially advance a drill to a workpiece and that can rapidly axially retract the drill from the workpiece.

Still another object of the invention is to provide a drill unit in which a preselected maximum axial force applicable to the quill by operating linkage can be established.

Other objects and advantages will become apparent from the following description and accompanying drawing in which:

FIG. 1 is an elevational cross-sectional view of one embodiment of a drill unit chosen to illustrate the features of the present invention, shown with the drill in its fully retracted position;

FIG. 2 is a plan cross-sectional view taken along the line 2—2 in FIG. 1;

Figure 3:
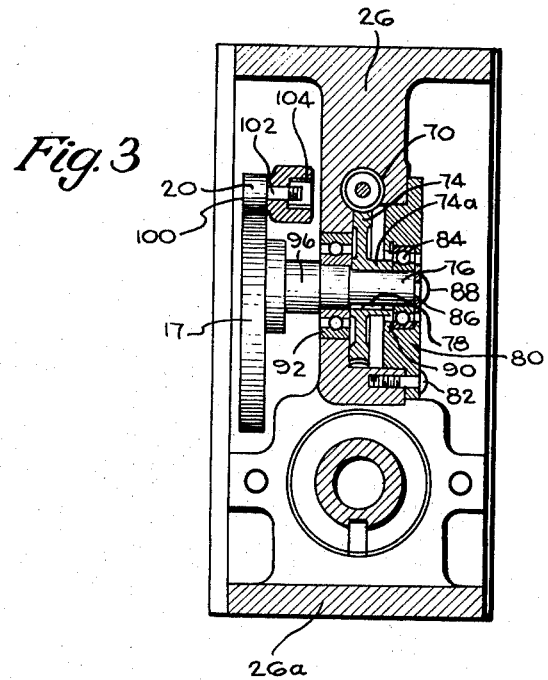
FIG. 3 is an elevational cross-sectional view taken along the line 3—3 in FIG. 1.

Generally, and with reference to FIG. 1 of the drawing, there is provided in accordance with the present invention a drill unit generally designated by the reference numeral 10. The drill unit 10 is particularly adapted for controlled axial advancement of a drill from a retracted position toward a workpiece. The drill can be of any suitable type for forming a hole in the particular workpiece to be operated upon. Comprising the drill unit 10 is a quill housing 12, a quill 16 mounted within the quill housing 12 and axially movable with respect thereto, a rotatable cam 17, drive means 19 for rotating the cam 17, a cam follower 20 for converting the rotational movement of the cam 17 into reciprocating movement, linkage 21 between the cam follower 20 and the quill 16 whereby the quill 16 is axially advanced toward the workpiece and retracted therefrom after a hole has been drilled in the workpiece, and motor means 18 mounted on the quill 16 at the end adjacent the workpiece, the motor means 18 being axially movable therewith and adapted to rotate the drill so that the drill enters into and precisely forms a hole in the workpiece. The drill is adapted to be rapidly advanced to the workpiece, driven under controlled limited force to drill a hole in the workpiece to the desired depth, and then retracted from the workpiece to its initial position. At all times while the drill is rotating, the axial force applicable to the drill is limited to a preselected maximum so that the drill is protected against damage and destruction. Axial movement of the quill 16 by the linkage 21 is limited to the preselected maximum by biasing means 22.

More particularly, and with particular reference to FIG. 1 of the drawing, the embodiment chosen to illustrate the principles of the present invention includes the quill housing 12 having an internal longitudinal bore in which the quill 16 is mounted and a housing 24 for the cam 17, the drive means 19, the cam follower 20, the linkage 21 and the biasing means 22. The housing 24 and the quill housing 12 are secured together by machine screws 25 or the like. A body casting 26 extends in a vertical position through the center of the housing 24 in order to support the various components of the drill unit 10 therein. The body casting 26 has a generally I-shaped cross-section taken in both the horizontal and vertical planes (as shown in FIGS. 2 and 3) and front and back covers 28 and 30 are secured to the ends of the I-shaped casting 26 by machine screws 32 or the like. The base of the drill unit 10 is accordingly a lower flange 26a of the body casting 26.

As shown in FIG. 1, the quill 16 is a hollow, tubular element that is disposed for axial movement within the quill housing 12 for advancement of the drill toward the workpiece and retraction therefrom. One end of the quill 16 i.e. the inner end, is connected to the linkage 21, which axially advances and retracts the quill. A groove 16a is advantageously longitudinally formed in the bottom of the quill 16 near the rear end thereof. A key 34 secured by a roll pin 36 to the quill housing 12 rides within the groove 16a upon axial movement of the quill by the linkage 21 to prevent rotational movement of the quill 16 and thus to accurately position the quill with respect to the workpiece. The outer end of the quill 16 is axially associated with drill receiving means 31, which in turn is operatively associated with the motor means 18 for rotating the drill so that it can enter into and form a hole in the workpiece. Desirably, the shank of the drill is received by the receiving means 31 including a chuck 48, which accurately maintains the drill in position for forming holes in the workpiece. Desirably, the shank of the drill As the quill 16 is axially movable within the quill housing 12 and as no bearing is provided between the quill and the quill housing, it is desirable to provide a plurality of lubricant-saturated felt washers 38 mounted in a recess in the quill housing 12 to lubricate the moving quill. An oiler 40 distributes lubricating oil to the felt washers 38 to reduce the coefficient of friction between the quill 16 and the quill housing 12. Furthermore, as the quill 16 is axially movable with respect to the quill housing 12, it has been found desirable to provide means for preventing dirt, dust or dust or other foreign particles from entering into the quill housing between the ground and polished coacting surfaces of the quill and the quill housing. To this end, a rubber bellows 42 is fastened between the outer end of the quill 16 and the adjacent end of the quill housing 12. The bellows 42 permits the quill to move freely with respect to the housing while forming a tight seal therebetween. A vent passageway 44 is provided in the quill housing 12 between the interior of the bellows 42 and the external environment to allow entrapped air to be vented upon compression of the bellows by retraction of the quill from the workpiece.

Located between the receiving means 31 for the drill and the quill 16 is the motor means 18, which is axially connected to the outer end of the quill 16. The motor means 18 is mounted to the outer end of the quill 16 by machine screws 33 or the like, the chuck 48 being disposed at the outer end of the motor means. Preferably, the motor means 18 comprises an air motor 46 or similar device. The air motor 46 is independent of the drive means 19 for rotating the cam 17. Generally, the preferred air motor 46 for rotating the drill is a turbine and includes an armature from which a drive shaft extends and in which the shank of the drill is located and which can be rotated along with the drill by admitting compressed gas such as air from a source thereof through a line 47 at a controlled rate and pressure and directing such air against the armature. An advantage in employing an air motor 46 for rotating the drill is that the armature of such a motor can be rapidly rotated by the admitted compressed air at speeds of up to 50,000 rpm, despite its small size. As the armature is rotating at such a high rate of speed, it is advantageous to employ air bearings to mount the armature. An air bearing is defined by a small gap left between two highly ground and polished surfaces, one rotating at high speed and one fixed, with compressed gas such as air flowing therebetween, so that the coefficient of friction therebetween is quite low. The air is admitted through a line 49 from the same source desirably as is the air entering through the line 47. It is contemplated, however, that although an air motor is the presently preferred means for rotating the drill, other motor means 18 might be employed, such as an electric motor, to rotate the drill, provided that the motor can be axially moved along with the quill 16 and can be disposed at the outer end of the quill 16. However, commercially available electric motors are normally capable of operation at speeds of up to only about 20,000 rpm. As the drill is operating at such a high rate of rotation, it is advantageous that the drill continuously rotate at all times, whether it is within the workpiece or whether it is fully retracted, to eliminate the energy needed for commencing and terminating rotation. Thus, the drill need not commence rotation for entrance into the workpiece, even though the drive means 19 may be inoperative. The drive system of the drill unit 10 for imparting axial movement to the quill 16, the motor means 18 and the drill includes the rotatable drive means 19, the cam 17, the cam follower 20 and the linkage 21. Preferably, the drive means 19 comprises an electric motor 50 secured to the housing 24 by machine screws 52 or the like. The electric motor 50 is preferably SCR controlled and is capable of operating at varying speed. It should be understood, however, that other types of motors, such as pneumatic motors, can also be employed, provided that these other motors are capable of variable speed rotation. A cable connector 53 connects the motor 50 to a suitable power supply. A drive shaft 54 (FIG. 2) extends outwardly from the armature of the electric motor 50 and is continuously rotated thereby.

Turning to FIG. 2 of the drawing, it can be seen that the drive means 19 further comprises means for transmitting the rotational movement of the drive shaft 54 of the electric motor 50. The drive shaft 54 of the drive means 19 is received within a recess in a worm shaft 56 and is keyed thereto by a pin 58. Hence, the worm shaft 56 is continuously rotatable along with the drive shaft 54 at the same rate of rotation. To allow rotation of the worm shaft 56, there is provided a bearing 60 having its inner race keyed to the worm shaft 56 by a retaining ring 62 or the like and having its outer race disposed within a recess in the body casting 26. A bearing cap 64 maintains the outer race of the bearing 60 within the body casting 26 and is secured thereto by a screw 66 or the like. The worm shaft 56 is contained within a bushing 68 that allows accurate positioning of the worm shaft 56 within the body casting 26. Extending outwardly from the end of the worm shaft 56 is a worm 70. A roll pin 72 is disposed through the worm 70 and the worm shaft 56 so as to key the worm and the worm shaft together. The worm 70 is externally threaded such that it can directly transmit the rotational movement of the electric motor 50, as is conventional.

Referring next to FIG. 3 of the drawing, it can be seen that the worm 70 engages an externally toothed worm gear 74 that is mounted for rotation in a vertical plane upon a horizontally disposed worm gear shaft 76. Rotational movement of the externally threaded worm 70 causes the externally toothed worm gear 74 to also rotate, thereby reducing the speed of the drive system and increasing the power thereof. A Woodruff key 78 or similar device secures the worm gear 74 to its shaft 76. The shaft 76 is mounted for rotation in a worm cartridge 80 that is secured to the body casting 26 by machine screws 82 or the like. To provide rotation of the shaft, the shaft 76 is secured at one end thereof to the inner race of a bearing 84, the inner race being secured in position between a hub 74a of the worm gear 74 and a washer 86 that is slightly larger in diameter than the shaft 76 and is secured thereto by an axially disposed screw 88 or the like. The outer race of the bearing 84 is maintained within the worm cartridge 80 by a retaining ring 90 or the like at one end thereof. It is presently preferred to dispose the shaft 76 upon which the worm gear 74 is mounted for rotation within a second bearing 92 at the opposite end of the shaft from the bearing 84. This second bearing 92 serves to properly align the shaft 76 so that rotational movement of the worm gear 74 is accurately transmitted. The bearing 92 has its inner race held in position between the worm gear 74 and an enlarged portion of the worm gear shaft 76 and its outer race secured in a recess within the body casting 26.

Connecting the drive means 19 and the quill 16 to convert the rotational movement of the drive means into reciprocating movement, thereby advancing and retracting the quill, are the cam 17 mounted for rotation in a vertical plane within the housing 24, the cam follower 20 and the linkage 21. The cam 17 is preferably elliptical in shape, i.e., it has an elliptical peripheral camming surface, so that its rotational movement can be imparted in a variable manner. Thus, as the cam 17 rotates, the periphery 17a thereof does not generate a circular pattern. The cam 17 mounted for rotation on a shaft 96, which is an axial extension of the worm gear shaft 76. In the preferred embodiment, the shaft 96 of the cam 17 is mounted eccentrically to the cam, with screws 98 or the like securing the cam 17 to the shaft 96. As best seen in FIG. 1, the cam shaft 96 is disposed in one quadrant of the elliptical cam 17. Hence, rotation of the periphery 17a of the cam 17 generates an elliptical figure that is more than twice as long in one direction as it is in a transverse direction.

The rotational movement of the drive shaft 54 of the electric motor 50, as reflected in elliptical rotation of the cam 17, is converted into substantially reciprocating movement. In converting the elliptical rotational movement of the cam 17, there is provided the cam follower 20 that rides upon the periphery 17a of the cam and is controlled thereby and the linkage 21 operated by the cam follower. The cam follower 20 is in the form of a roller 100 that is controlled by rotation of the periphery of the cam. Preferably, however, the cam follower 20 is biased into position so that it rides upon the cam 17. The cam follower 20 is mounted upon a shaft 102 extending axially outwardly therefrom, the cam follower 20 being attached to the shaft 102 by an Allen nut 104 or the like.

In comprising the linkage 21, a pivotable feed arm 106 (as shown in FIG. 1) is preferably utilized to transmit the elliptical rotational movement of the cam 17 imparted to the cam follower 20 into substantially reciprocating movement at the quill 16. Thus, the feed arm 106 comprises a vertically disposed L-shaped arm pivotally mounted at its apex to a shaft 108 extending outwardly therefrom. A tapered pin 110 secures the shaft 108, which is mounted within a bearing (not shown), to the feed arm 106. The cam follower 20 is desirably disposed at the end of the short portion 106a of the L-shaped feed arm 106 while additional linkage 21 for transmitting reciprocating movement to the quill 16 is disposed at the end of the long portion 106b of the feed arm 106.

Thus, a link shaft 112 is pivotally mounted in a needle bearing 114 or the like at the end of the long portion 106b and transversely thereto such that the link shaft 112 is substantially transversely movable with respect to its axis. Extending outwardly from and transversely to the end of the link shaft 112 is a ball link 116 for receiving the substantially transversely applied force from the link shaft 112 and transmitting it substantially axially to the quill 16. The ball link 116 has a spherical ball element 118 at the end thereof that is received and mounted within the end of the quill 16. The ball element 118 at the end of the ball link 116 that is disposed within the quill 16 is prevented from disengaging the quill 16 by a ball seat 120 that is maintained in position by a retaining ring 122 or the like. The ball seat 120 is bevelled to allow the ball 118 to pivot slightly within the end of the quill 16 upon substantially reciprocating movement of the ball link 116, so that reciprocating movement can be imparted to the quill 16. Thus, as the cam follower 20 is moved by rotation of the cam 17, the short portion 106a of the feed arm 106 connected to the cam follower 20 pivots about the shaft 108. This, in turn, causes the long portion 106b of the feed arm 106 to pivot, the link shaft 112 associated therewith thereby turning within the needle bearing 114 to cause the ball link 116 to axially reciprocate the quill 16 and the drill associated therewith.

Disposed within the interior of the quill 16 is a compressed spring 130, which in part comprises the biasing means 22. The purpose of the compressed spring 130 is two-fold. First, the spring 130 transmits reciprocating force from the ball link 116 of the linkage 21 through the quill 16 to the motor means 18 so as to move the motor means and the drill into engagement with the workpiece. Second, the spring 130 is compressible so that in the event the drill is unable to penetrate the workpiece, the force exerted via the ball link 116 by the drive means 19 will compress the spring 130 axially within the quill 16, rather than forcing the quill 16 and its associated motor means 18 and drill further into the workpiece. Thus, the spring 130 interposed between the linkage and the quill establishes the maximum axial force that can be applied to the drill by the ball link 116 of the linkage 21 through the quill 16 and the motor means 18. When the maximum axial force applied by the ball link 116 to the spring 130 at least equals the axial force applied by the drill to the workpiece, the spring 130 will be compressed within the quill 16.

At the rear end of the spring 130 within the quill 16 is disposed a plunger 132. The plunger 132 is normally axially movable together with the quill 16 upon the exertion of a force by the ball element 118 of the ball link 116 to the plunger 132. The spring 130 is chosen to have sufficient rigidity that a force exerted upon the plunger 132 causes contemporaneous axial movement of the quill 16. However, when the axial force applied by the ball link 116 to the spring 130 through the plunger 132 exceeds the force applied by the drill to the workpiece, the plunger 132 will move axially within the quill 16. At the front of the spring 130 is a set screw 134. The set screw 134 is threadably inserted axially within the quill 16 such that it can be positioned at various points along the length of the quill. The deeper the screw 134 is inserted within the quill 16, the greater the compression of the spring 130. Hence, the compression of the spring 130 between the plunger 132 and the set screw 134 can be selectively adjusted by repositioning the set screw 134 so as to establish the preselected maximum axial force.

Figure 4:
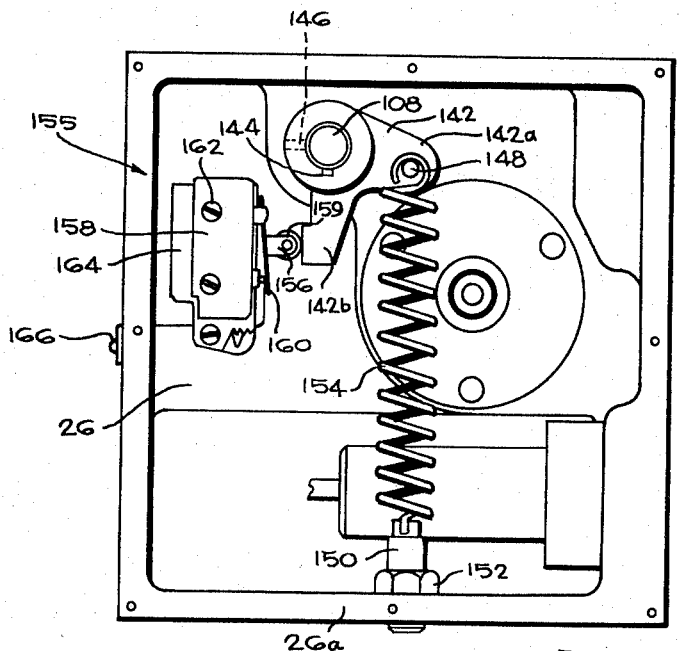
FIG. 4 is an elevational view taken along the line 4—4 in FIG. 2.

Turning now to FIG. 4 of the drawing, there can be seen apparatus for assisting in retraction of the drill from the workpiece. As shown, the shaft 108 upon which the feed arm 106 pivots extends through the body casting 26. At the opposite end of the shaft 108 from the feed arm 106 is located a torque arm 142. This torque arm 142 is keyed to the shaft 108 by a Woodruff key 144 or the like and a set screw 146 serves to accurately position and adjust the torque arm 142. The torque arm 142 is generally V-shaped, a first finger 142a thereof having a pin 148 extending outwardly therefrom. An upwardly extending set screw 150 secured by a nut 152 extends from the base 26a of the housing 24. A compression spring 154 is disposed between and is connected at opposite ends to the set screw 150 and the pin 148. This spring 154 biases the torque arm 142 such that the associated feed arm 106 tends to retract the ball link 116 and hence the quill 16 within the housing 24. Thus, in order for the quill 16 and the drill to advance toward the workpiece it is necessary for the cam 17 to pivot the feed arm 106 via the cam follower 20 against the force of the spring 154.

Apparatus 155 for terminating reciprocating movement of the drill can be seen in FIG. 4. In comprising the apparatus 155, a second finger 142b of the torque arm 142 is adapted to engage an actuator 156 of a microswitch 158. The microswitch 158 through suitable controls (not shown) stops the motor 50 after a drill hole has been completed and the drill retracted. It is actuated each time the quill 16 is axially retracted by the ball link 116 and the feed arm 106, which are connected to the torque arm 142 which actuates the microswitch 158. Typically, the actuator 156 comprises a friction wheel 159 mounted upon a leaf spring 160 that is in turn mounted upon the microswitch. The microswitch 158 is connected by screws 162 or the like to a mounting bracket 164 that is secured to the body casting 26. The microswitch 158 can be manually overridden by suitable controls (not shown) actuated by a push button 166.

Having thus described the drill unit 10, the entire operating sequence of the unit will be described. As the drive means 19 including the electric motor 50 is actuated, the drive shaft 54 thereof rotates to provide rotational movement. Hence, the drive shaft 54 turns the worm shaft 56 and the worm 70 attached thereto (as shown in FIG. 2). Thereupon, the worm 70 engages and rotates the worm gear 74, which has its shaft 76 axially aligned with the shaft 96 of the cam 17 (as shown in FIG. 3). Rotation of the drive shaft 54 by the motor 50 causes rotational movement of the cam 17 about its shaft 96. As the cam 17 has an elliptical camming surface 17a, and as the cam is eccentrically mounted upon the shaft 96 the roller 100 of the cam follower 20 is caused to ride on the camming surface to follow a short, reciprocating arcuate path relative to the shaft 108. The needle bearing 114 mounted at the opposite end of the pivotable L-shaped feed arm 106 correspondingly follows a short, reciprocating arcuate path relative to the shaft 108. As the needle bearing 114 moves, it causes reciprocating movement of the link shaft 112 mounted therein, its attached ball link 116 and the quill 16. Thus, rotational movement of the drive shaft 54 of the motor 50 is converted into reciprocating movement of the quill 16. When the ball link 116 applies a force to the plunger 132 disposed within the quill 16, the plunger and the quill normally move axially forward together toward the workpiece. The quill 16, which is secured at its forward end to the motor means 18, moves the drill received in the motor means to a position adjacent the workpiece so that the drill can enter into and form a hole in the workpiece.

The motor means 18, comprising the air motor 46, is continuously rotated at a speed of up to about 50,000 rpm. Thus, the drill which is held within the chuck 48 at the outer end of the air motor 46 is also rotated at an exceedingly high speed. As the drill is advanced toward the face of the workpiece, it is introduced therein and as it is rotating at a high rate of speed, it drills a precise and accurately positioned hole in the workpiece. The drill is continuously advanced into the workpiece by the drive means 19, the cam 17, the cam follower 20 and the linkage 21 until the peripheral camming surface 17a of the cam 17 reaches the highest point in its elliptical path. When the camming surface 17a reaches this high point, the cam follower 20 has caused the connected feed arm 106 to pivot so that the ball link 116 has advanced the quill 16 to its furthest forward position.

As the cam 17 continues to rotate, the cam follower 20 follows its reciprocating path to a lower position, causing the connected feed arm 106 to pivot so that the ball link 116 retracts the quill 16 along with the air motor 46 and the drill. The compression spring 154 connected to the torque arm 142 assists in the retraction of the quill 16. As the drill, the air motor 46 and the quill 16 retract, the pivoting feed arm 106 contemporaneously pivots the torque arm 142 keyed thereto so that the finger 142b thereof engages the actuator 156 of the microswitch 158. As the microswitch 158 is actuated, suitable controls terminate action of the electric motor 50.

As the plunger 132 is normally axially movable together with the quill 16, the force exerted by the drive means 19 through the linkage 21 is directly imparted to the drill. However, as it is particularly desirable to prevent the drill from entering the workpiece if the workpiece is too hard to be drilled, the plunger 132 is adapted to axially move with respect to the quill 16 should this condition occur. Thus, the maximum axial force that can be applied by the drill unit 10 to the drill is selectively established, protecting the drill from destruction.

It should be apparent from the foregoing discussion that precise and accurate positioning of the high speed drill is possible. It has been found that the drill can be positioned in the workpiece within a tolerance of 0.0001 inch. This is made possible by the reciprocating movement of the quill 16 and the air motor 46 without any rotational movement thereof. This precise positioning is also made possible by disposing the motor means 18 comprising the air motor 46 for rotating the drill at the outer end of the quill 16 such that it is axially movable therewith, rather than at some remote location.

Thus, the present invention provides an improved cam-operated drill unit for drilling holes in a workpiece. The invention further provides drilling apparatus for precisely positioning a rapidly rotating drill in relation to a workpiece. The drill unit of the invention is cam-operated so that it can rapidly axially advance a drill to and retract the drill from a position adjacent a workpiece. Furthermore, the drill unit of the invention obviates destruction of the drill upon encountering a workpiece that is particularly difficult to drill.

While one specific form of the invention has been shown and described, it should be apparent that various modifications could be made therein without departing from the scope of the invention. For example, instead of an electric motor 50 comprising the drive means 19 for advancing the drill to and retracting the drill from the workpiece, it is within the scope of the invention to provide a motor for the drill unit 10 that is operated by compressed air. In such a unit the same compressed air source that operates the air motor 46 for rotating the drill might be used for rotating the motor means of the drive means.

Various of the features of the invention are set forth in the following claims.

I claim:

1. A drill unit adapted for controlled precision axial movement of a drill from a retracted position toward a workpiece comprising a housing, a quill mounted within said housing and axially movable with respect thereto, rotatable cam means, drive means for rotating said cam means, cam follower means operated by said cam means for converting the rotational movement of said cam means into reciprocating movement, linkage means between said cam follower means and said quill for axially reciprocating movement of said quill toward and away from the workpiece, biasing means interposed between said linkage means and said quill establishing a preselected maximum axial force applicable to said quill by said linkage means, motor means mounted on said quill and axially movable therewith, and drill holding means on said motor means.

2. A drill unit in accordance with claim 1 wherein said biasing means comprises a compressed spring.

3. A drill unit in accordance with claim 2 wherein the compression of said spring is selectively adjustable so as to establish said preselected maximum axial force.

4. A drill unit in accordance with claim 3 wherein said drive means comprises a motor, a worm rotatable by said motor and a worm gear rotatable by said worm for rotating said cam means.

5. A drill unit in accordance with claim 3 wherein said cam means comprises an elliptical cam element eccentrically mounted upon a shaft.

6. A drill unit in accordance with claim 1 wherein said motor means comprises an air motor, a drive shaft, and drill receiving means on the outer end of said drive shaft.

* * * * *